(12) United States Patent
Lin

(10) Patent No.: US 11,224,303 B2
(45) Date of Patent: Jan. 18, 2022

(54) ORNAMENT FIXTURE STRUCTURE

(71) Applicant: Ling Yung Lin, Taipei (TW)

(72) Inventor: Ling Yung Lin, Taipei (TW)

(*) Notice: Subject to any disclaimer, the term of this patent is extended or adjusted under 35 U.S.C. 154(b) by 100 days.

(21) Appl. No.: 16/844,155

(22) Filed: Apr. 9, 2020

(65) Prior Publication Data
US 2021/0315405 A1    Oct. 14, 2021

(51) Int. Cl.
*A47B 96/06*   (2006.01)
*A47G 33/10*   (2006.01)
*F16M 13/02*   (2006.01)
*A47G 33/08*   (2006.01)

(52) U.S. Cl.
CPC ........... *A47G 33/10* (2013.01); *F16M 13/022* (2013.01); *A47G 2033/089* (2013.01)

(58) Field of Classification Search
CPC .. A47G 33/10; A47G 33/08; A47G 2033/089; A47G 2033/0827; F16M 13/022
USPC .......................................... 248/230.4; 428/99
See application file for complete search history.

(56) References Cited

U.S. PATENT DOCUMENTS

| | | | | |
|---|---|---|---|---|
| 6,357,710 B1* | 3/2002 | Fielden | ................ | A45B 11/00 248/231.51 |
| 8,109,279 B2* | 2/2012 | Chudzik | ................ | A45D 8/20 132/277 |
| 8,863,761 B2* | 10/2014 | Wang | ....................... | A45D 8/24 132/277 |
| 9,211,026 B1* | 12/2015 | McLemore | ............ | A47G 33/08 |
| 9,237,820 B2* | 1/2016 | Forbes | ................... | A47G 33/10 |

* cited by examiner

*Primary Examiner* — Todd M Epps
(74) *Attorney, Agent, or Firm* — Rabin & Berdo, P.C.

(57) ABSTRACT

A ornament fixture structure, used to secure an ornament onto a decorative main body, includes a positioning clamp for clamping onto the decorative main body and a supporting shaft provided for the ornament to be mounted and attached thereon. The positioning clamp includes an axial tube, a left clamp member and a right clamp member. The left and right clamp members are arranged at two sides of the axial tube respectively, which also include left and right jaw portions extended to front sides thereof and provided for clamping, left and right wings extended to rear sides thereof and provided for operation. The supporting shaft uses its bottom end for attaching onto the axial tube, and a supporting end is formed at the top end in order to allow the ornament to be mounted thereon.

20 Claims, 10 Drawing Sheets

ORNAMENT FIXTURE STRUCTURE

BACKGROUND OF THE INVENTION

1. Technical Field

The present invention relates to an improvement of a structure for securing an ornament, in particular, to an ornament fixture structure with facilitated operation and stable structure.

2. Description of Related Art

During the holidays, people often use seasonal ornaments for decoration in order to enhance the holiday atmosphere. For example, during Christmas, people often decorate Christmas trees at the living environment or stores etc. for appealing display.

During the decoration of Christmas trees, in addition to the use of sparkling lights or decoratives on the Christmas trees, there are typically ornaments in the shapes of star or representative figures for decorating the Christmas trees. The ornament being placed on the top most of a Christmas tree is a tree-top ornament. Presently, most of the tree-top ornaments available in the market use a conical shape element, such as a horn shape, for placing on the top of the Christmas tree. Nevertheless, such method of placement cannot achieve stable fixation for the decoration, and the tree-top ornament is extremely likely to be tipped over or to fall off the tree or due to slight shaking of the tree, causing great hassles to the use thereof. Furthermore, it is also known that the fixation methods of hook and loop fastener tape and straps etc. can be used; however, the stability of such fixation relies mostly on the effort of the user in ensuring the stability thereof. In addition, any slipping of the straps used can also cause the tree-top ornament to be tipped over or to fall off, leading to hassles to the use thereof.

BRIEF SUMMARY OF THE INVENTION

In view of the aforementioned drawbacks, the present invention provides a convenient and simple solution by providing an ornament fixture structure to allow users to secure a tree-top ornament on to a decorative main body.

The ornament fixture structure is mainly used to secure an ornament onto a decorative main body, and its technical means and structural characteristics thereof comprise a positioning clamp and a supporting shaft. The positioning clamp comprises an axial tube, a left clamp member and a right clam member; wherein the left clamp member and the right clamp member being located at two sides of the axial tube respectively and configured to rotate relative to each other with the axial tube as a supporting point. The left clamp member comprises a left jaw portion extended to a front side thereof and a left wing extended to a rear side thereof. The right clamp member is arranged opposite from the left clamp member and comprises a right jaw portion extended to a front side thereof and a right wing extended to a rear side thereof. The left jaw portion and the right jaw portion are arranged to extend in opposite curves and configured to open and close relative to each other in order to allow the positioning clamp to clamp onto the decorative main body. The supporting shaft is configured to use a bottom end thereof for attaching onto the axial tube and having a top end formed of a supporting end provided for the ornament to be mounted and attached thereon. In addition, a front end of the left jaw portion includes a left jaw front edge, a front end of the right jaw portion includes a right jaw front edge, the left clamp member is configured to use the left jaw front edge to engage with and abut against the right jaw front edge of the right clamp member, and an angle formed between the left wing and the right wing is at least greater than 45 degree and less than 90 degree when the left jaw front edge engages with and abuts against the right jaw front edge.

According to the aforementioned structure, wherein the positioning clamp further comprises an elastic element; the elastic element is arranged on the axial tube and is configured to provide an elastic reaction force on the left clamp member and the right clam member in order to allow the left jaw portion and the right jaw portion to clamp relative to each other.

According to the aforementioned structure, wherein a top end of the axial tube includes an insertion hole connected thereto in order to allow the supporting shaft to be inserted therein for attachment.

According to the aforementioned structure, wherein the left jaw front edge includes at least one left protruding slab, and the left protruding slab is configured to engage with and abut against a recess formed at the right jaw front edge.

According to the aforementioned structure, wherein the right jaw front edge includes at least one right protruding slab, and the right protruding slab is configured to engage with and abut against a recess formed at the left jaw front edge.

According to the aforementioned structure, wherein the left jaw front edge includes a plurality of left protruding slabs and recesses arranged alternatively, and the plurality of left protruding slabs and recesses are configured to correspondingly engage with and abut against a plurality of recesses and protruding slabs arranged alternatively on the right jaw front edge.

According to the aforementioned structure, wherein an inner side surface of the left jaw portion is a curved surface recessed inward, and the inner side surface of the left jaw portion includes a horizontal left gear rack arranged at a location opposite from the left protruding slab.

According to the aforementioned structure, wherein inner side surfaces of the left jaw portion and the right jaw portion are curved surfaces recessed inward, the inner side surface of the left jaw portion includes a horizontal left gear rack arranged at a location opposite from the left protruding slab, and the inner side surface of the right jaw portion includes a horizontal right gear rack arranged at a location opposite from the right protruding slab.

According to the aforementioned structure, wherein inner side surfaces of the left jaw portion and the right jaw portion are curved surfaces recessed inward, the inner side surface of the left jaw portion includes a horizontal left gear rack arranged at a location opposite from the plurality of left protruding slabs respectively, and the inner side surface of the right jaw portion includes a horizontal right gear rack arranged at a location opposite from the plurality of right protruding slabs respectively.

According to the aforementioned structure, wherein the left clamp member includes a left hinge bracket pivotally attached onto the axial tube and arranged between the left jaw portion and the left wing; and the right clamp member includes a right hinge bracket pivotally attached onto the axial tube and arranged between the right jaw portion and the right wing.

According to the aforementioned structure, wherein when the left jaw front edge engages with and abuts against the right jaw front edge, the left jaw portion and the right jaw portion are of a generally circular shape.

DETAILED DESCRIPTION OF THE INVENTION

Figure 1:
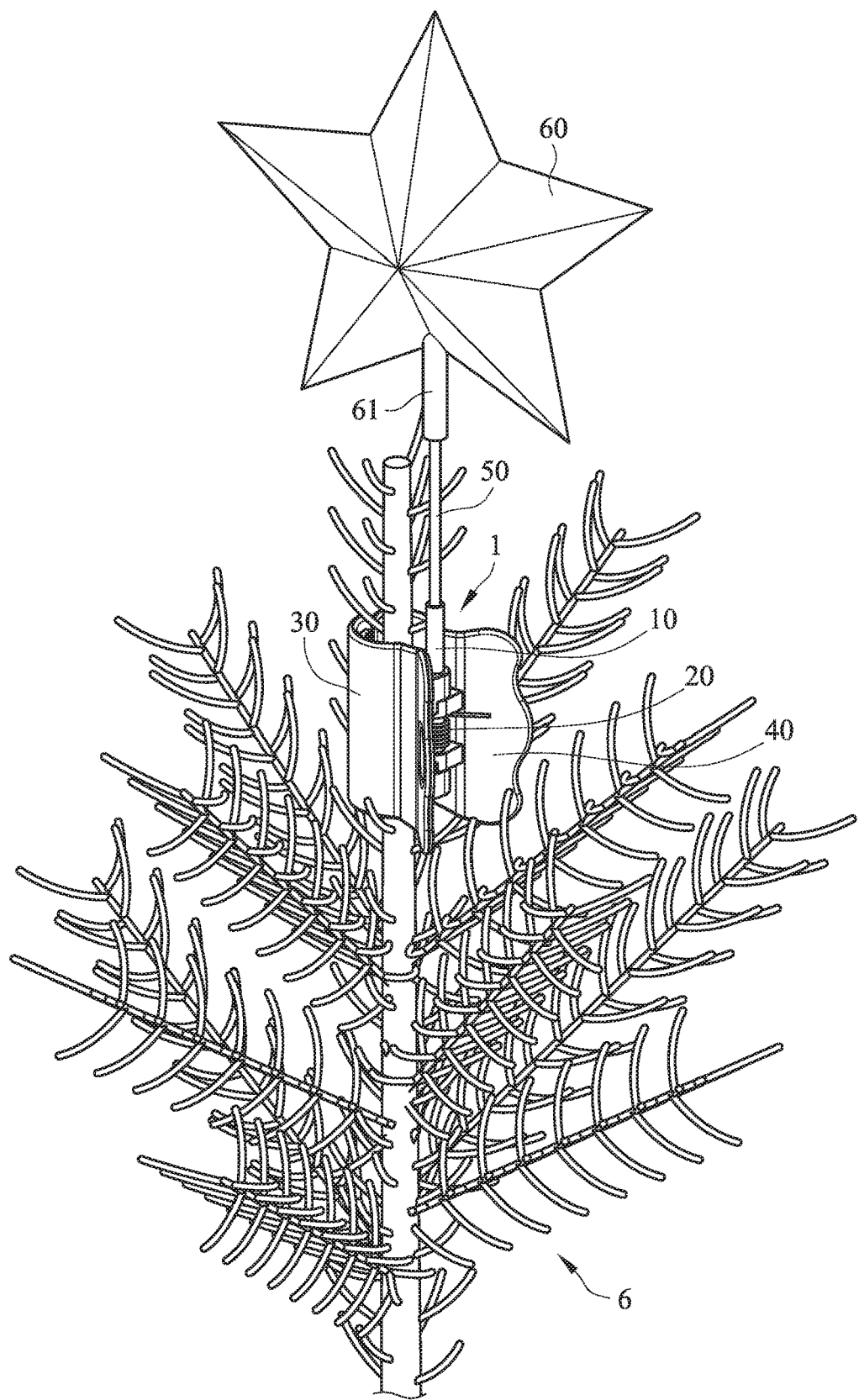
FIG. 1 is a perspective view of an embodiment of the present invention.
Figure 2:
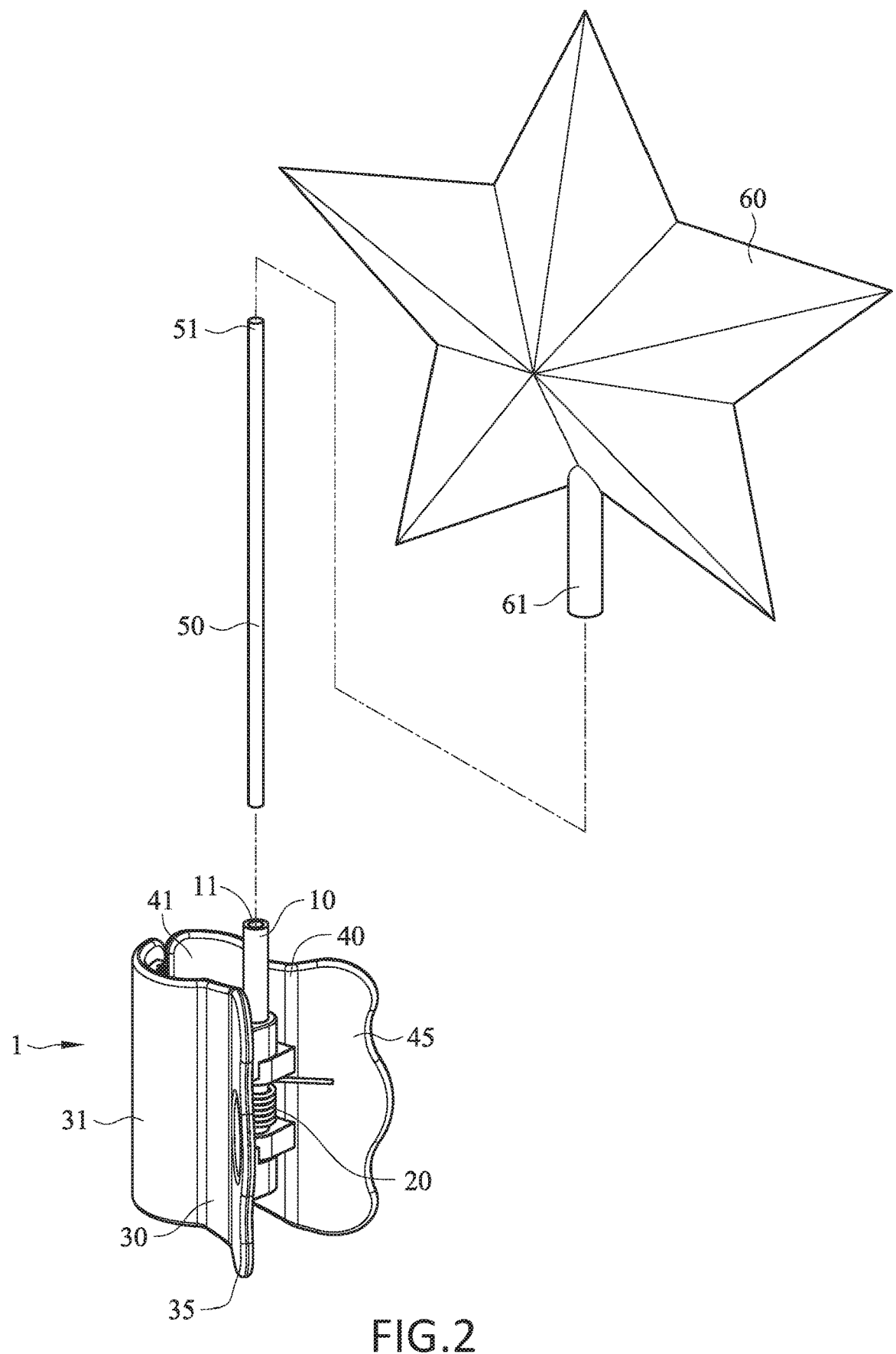
FIG. 2 is an exploded view of an embodiment of the present invention.

Please refer to FIG. 1 and FIG. 2. An ornament fixture structure of the present invention mainly comprises a positioning clamp 1 and a supporting shaft 2. By using the positioning clamp 1 to clamp onto a decorative main body 6 and providing a supporting end 51 at the top end of the supporting shaft 2, an ornament 60 can be fixed onto the supporting end 51 stably and firmly with a mounting portion 61. Consequently, a user is able to secure the ornament 60 onto the decorative main body 6 easily and conveniently while preventing the problem of falling off or tipping over of the ornament 60.

Please refer to FIG. 3 to FIG. 6 together. In an embodiment of the present invention, the positioning clamp 1 mainly comprises an axial tube 10, an elastic element 20, a left clamp member 30 and a right clamp member 40.

The top end of the axial tube 10 includes an insertion hole 11 formed thereon. The insertion hole 11 is connected to a hollow portion at the internal of the axial tube 10 in order to allow the supporting shaft 50 to be inserted therein with its bottom end for attachment. In this embodiment, the bottom end of the axial tube 10 can be of a closed or a slanted type in order to secure the supporting shaft 50 inserted therein. Certainly, in a feasible embodiment, the bottom end of the axial tube 10 can also have other adaptive design matching with the supporting shaft 50, such as a structural design for adjusting the extension position of the supporting shaft 50, in order to achieve the function of supporting the height of the ornament 60.

Figure 5:
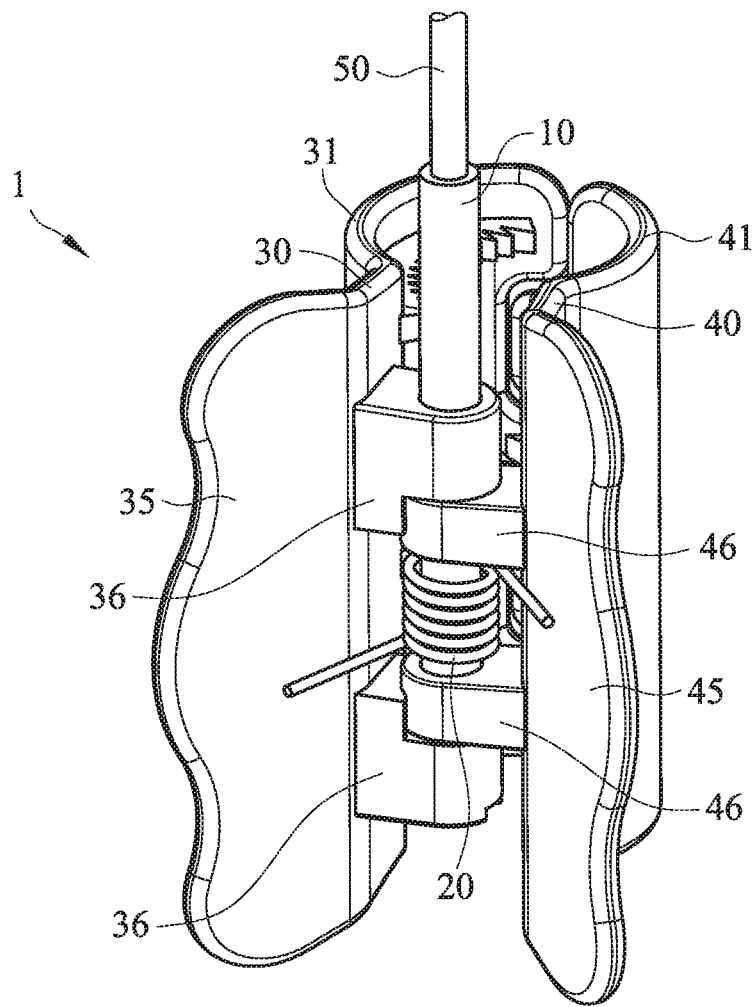
FIG. 5 is a rear view of an embodiment of the present invention with the positioning clamp in a closed state.

The left clamp member 30 and the right clamp member 40 are of a plate shape and located at two sides of the axial tube 10, as shown in FIG. 5. The left clamp member 30 includes two left hinge brackets 36 pivotally attached onto the axial tube 10, and the right clamp member 40 includes two right hinge brackets 46 pivotally attached onto the axial tube 10, in order to allow the left clamp member 30 and the right clamp member 40 to rotate relative to each other with the axial tube 10 as the supporting point. Please refer to FIG. 3 and FIG. 6. The left clamp member 30 uses the location of the left hinge bracket 36 as a base for a left jaw portion 31 and a left wing 35 to be extended therefrom toward a front side and a rear side respectively. In addition, the right clamp member 40 uses the location of the right hinge bracket 46 as a base for a right jaw portion 41 and a right wing 45 to extended therefrom toward a front side and a rear side respectively. The left jaw portion 31 and the right jaw portion 41 extend in curves opposite from each other, and they can be in a closed state (as shown in FIG. 3 to FIG. 6) and an open state (as shown in FIG. 7 to FIG. 9) in accordance with the relative rotation relationship between the left clamp member 30 and the right clamp member 40.

The elastic element 20, as shown in FIG. 5, is a torsion spring mounted onto the axial tube 10 and is arranged between the two right hinge brackets 46 of the right clamp member 40 in order to provide an elastic reaction force in an opposite direction on the left clamp member 30 and the right clamp member 40, thereby allowing the left clamp member 30 to be maintained with a reaction force in a clockwise rotational direction while allowing the right clamp member 40 to be maintained with a reaction force in a counterclockwise rotational direction. Consequently, when the positioning clamp 1 is under the unused state, the right clamp member 30 is able to allow a left jaw front edge 32 at a front end of the left jaw portion to engage with and abut against a right jaw front edge 42 at a front end of the right jaw portion 41 of the right clamp member 40, forming the closed state therebetween. The two left hinge brackets 36 of the left clamp member 30 are located at the outer sides of the two right hinge brackets 46 opposite from the elastic element 20 respectively, thereby allowing the left clamp member 30 and the right clamp member 40 to rotate relative to each other without any interference.

Figure 6:
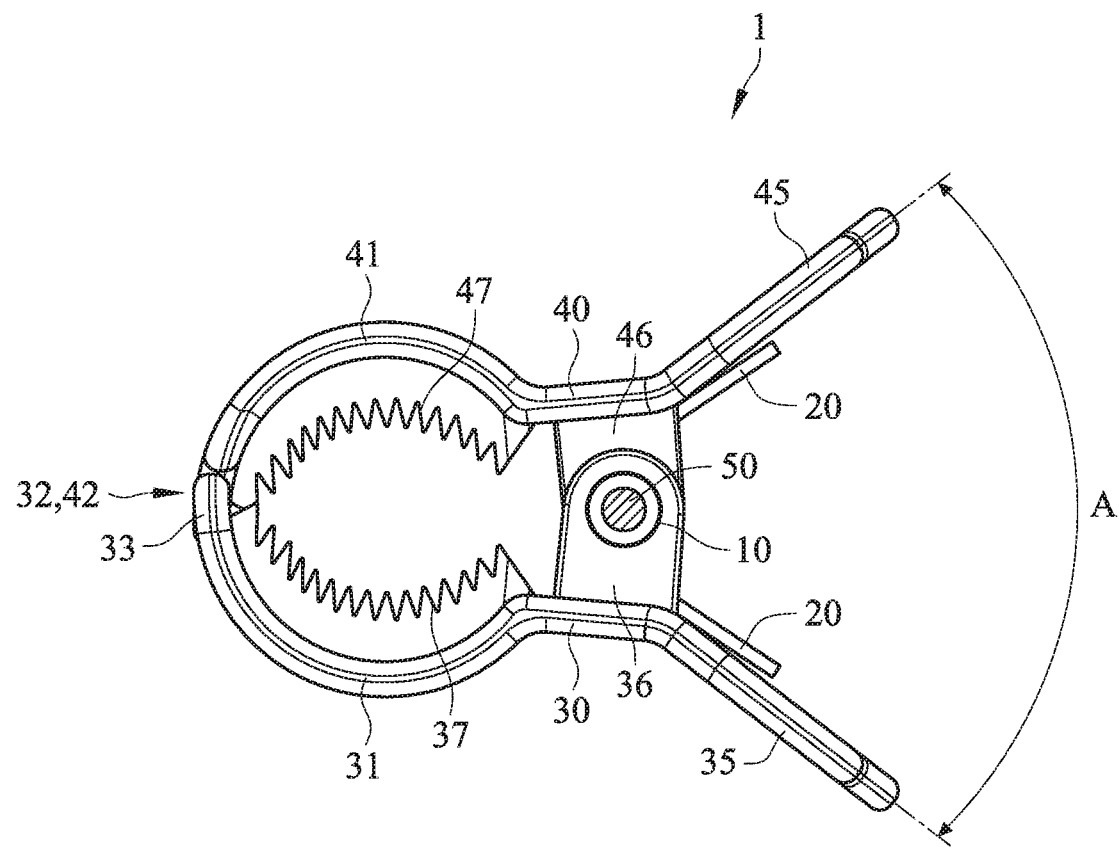
FIG. 6 is a top view of an embodiment of the present invention with the positioning clamp in a closed state.
Figure 9:
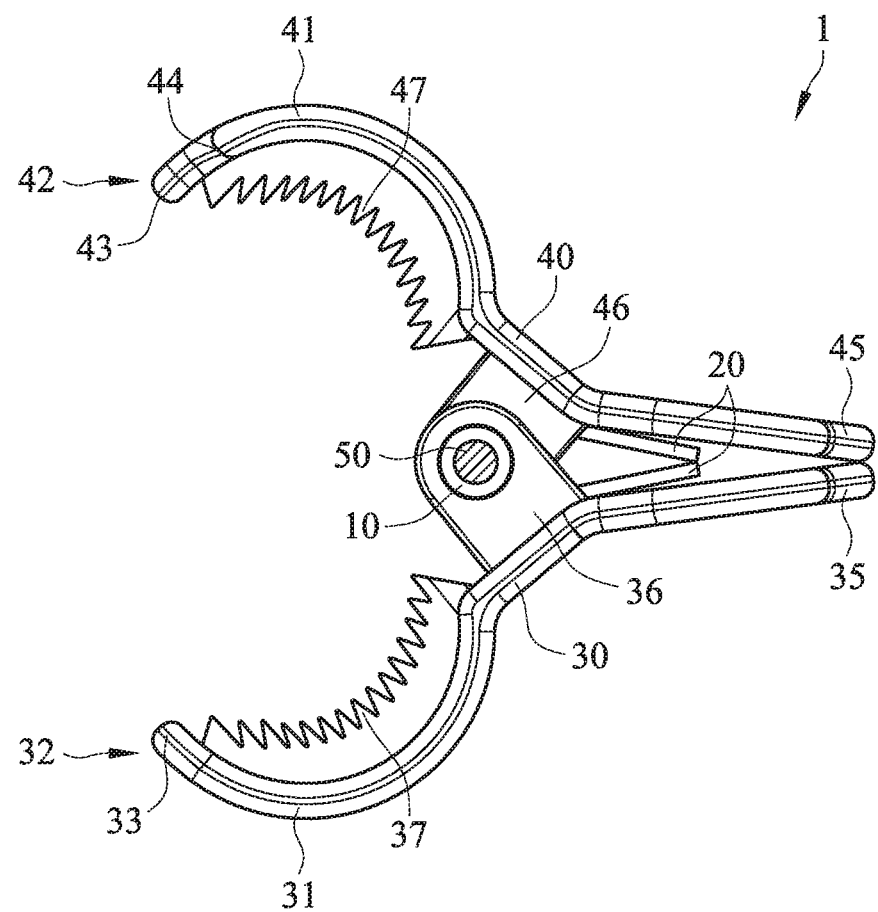
FIG. 9 is a top view of an embodiment of the present invention with the positioning clamp in an open state.
Figure 10:
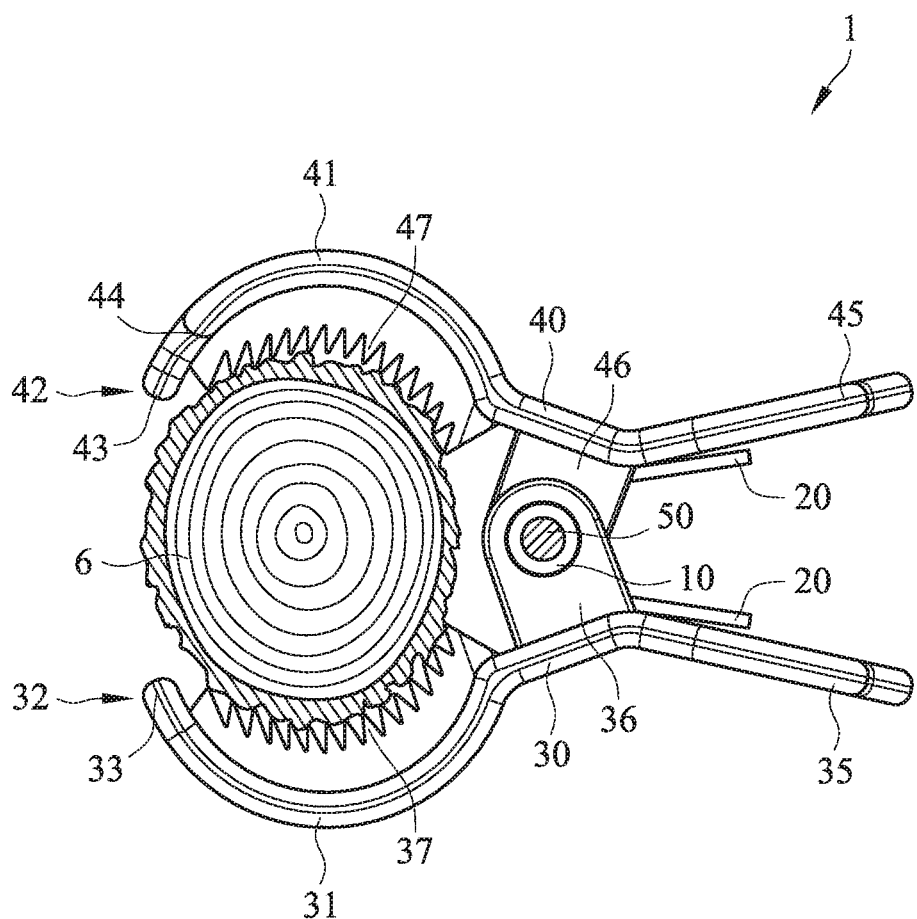
FIG. 10 is a top view of an embodiment of the present invention with the positioning clamp in a clamped state.

When it is not in use, as shown in FIG. 6, the left clamp member 30 and the right clamp member 40 are under the effect of the elastic reaction force of the elastic element 20 in order to maintain the left jaw front edge 32 to engage with and abut against the right jaw front edge 42 in a closed state. In this embodiment, in the closed state, the left jaw portion 31 and the right jaw portion 42 generally surround in a ring to form a circular shape. In addition, the angle A formed between the left wing 35 and the right wing 45 is preferably maintained at a range of greater than 45 degree and smaller than 90 degree in order to facilitate the use, such that force exertion would not be difficult due to an overly large angle A. Furthermore, during the pressing of the left wing 35 and the right wing 45, as the open state shown in FIG. 9, the left jaw portion 31 and the right jaw portion 41 are able to form a large opening in order to allow a user to easily install it onto an appropriate portion of the decorative main body 6. After releasing the left wing 35 and the right wing 45, the elastic reaction force provided by the elastic element 20 is able to allow the left jaw portion 31 and the right jaw portion 41 to clamp onto the two sides of the decorative main body 6 (as shown in FIG. 10), forming the clamped state.

Figure 3:
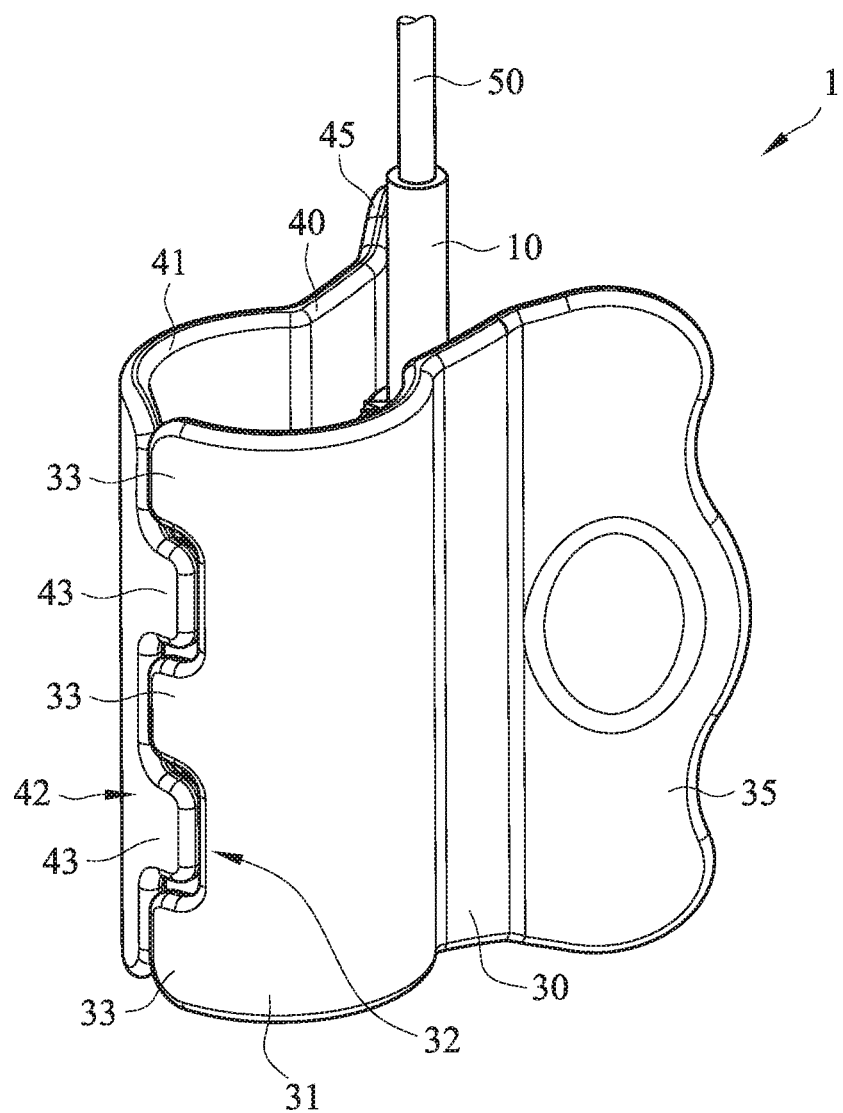
FIG. 3 is a front perspective view of an embodiment of the present invention with the positioning clamp in a closed state.
Figure 4:
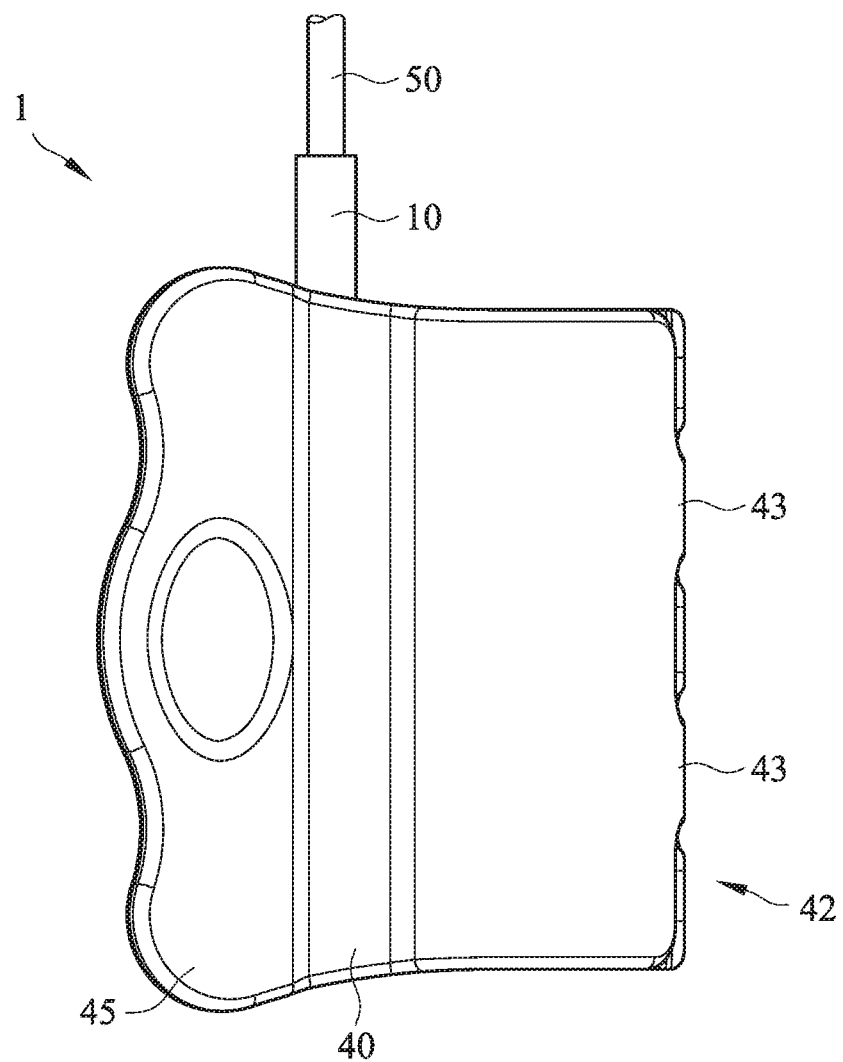
FIG. 4 is a side view of an embodiment of the present invention with the positioning clamp in a closed state.
Figure 7:
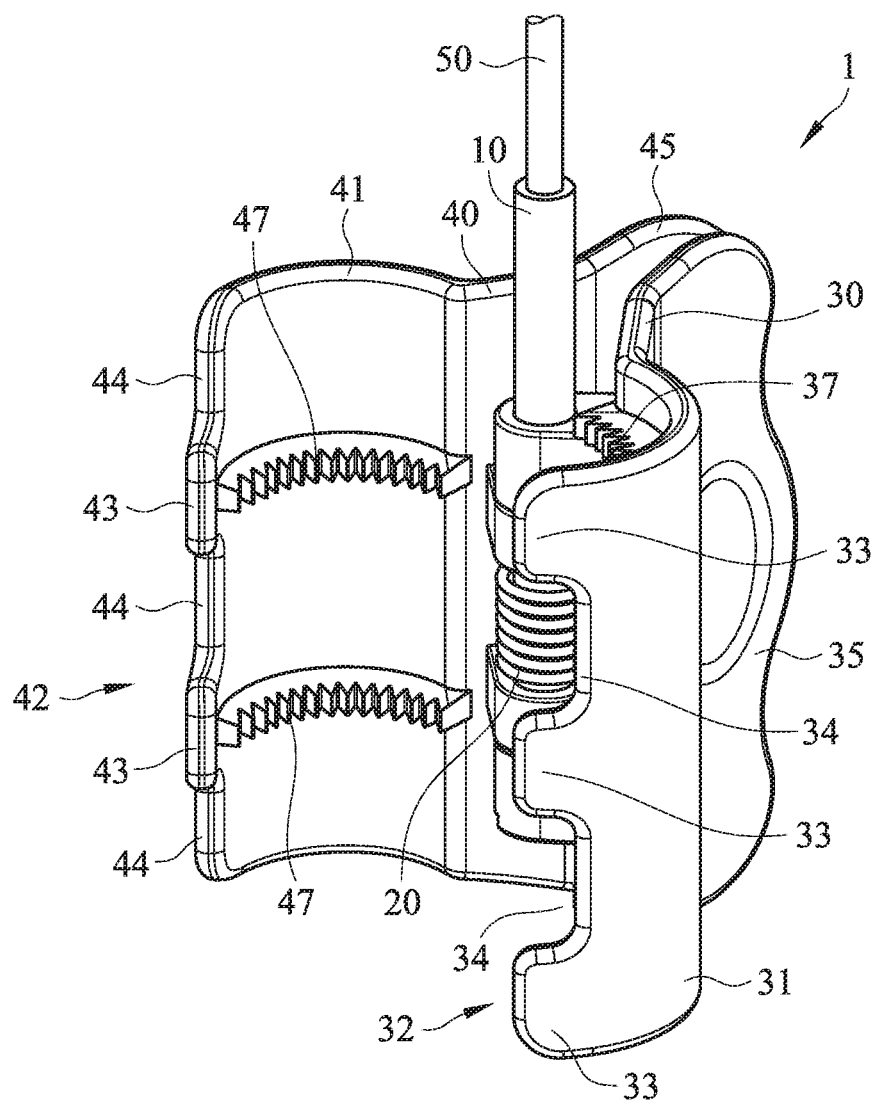
FIG. 7 is a front perspective view of an embodiment of the present invention with the positioning clamp in an open state.
Figure 8:
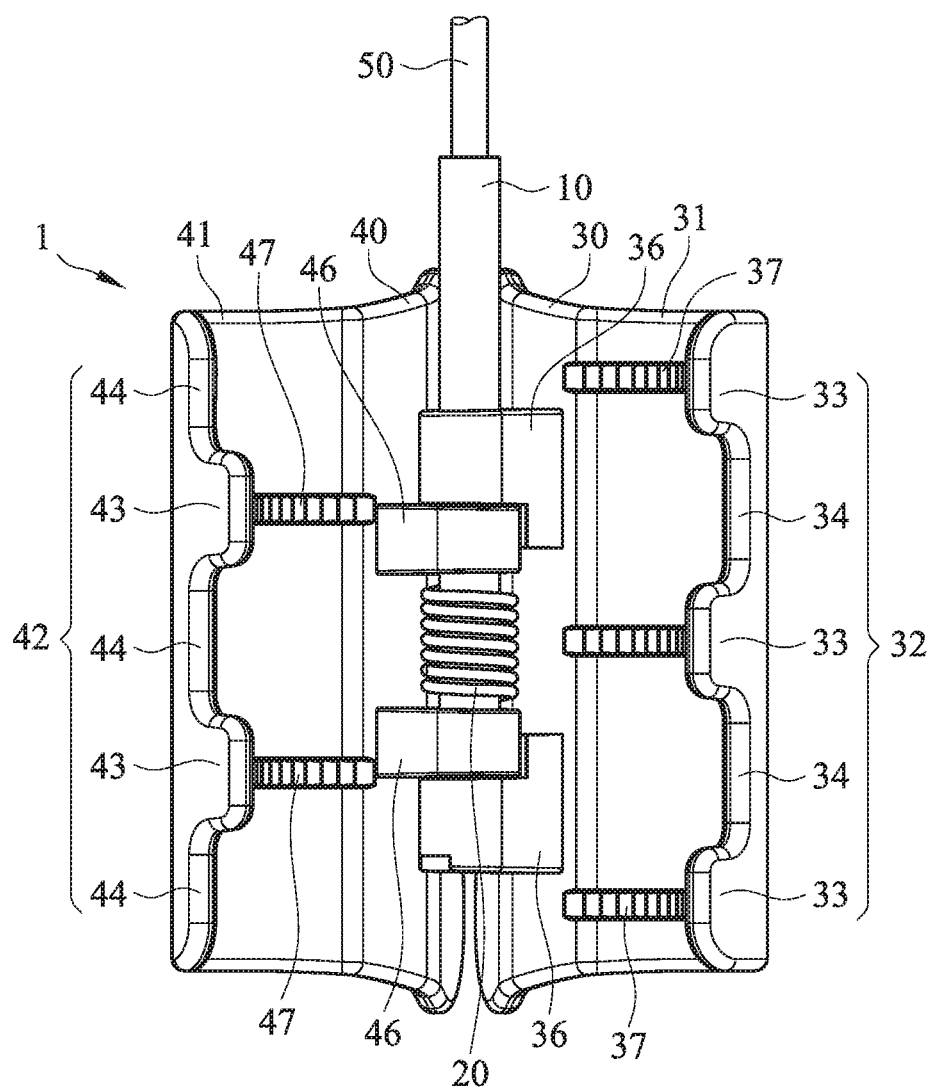
FIG. 8 is a front view of an embodiment of the present invention with the positioning clamp in an open state.

In this embodiment, the left jaw front edge 32 and the right jaw front edge 42 are of a zigzag front edge design (as shown in FIG. 3, 7 or 8). The left jaw front edge 32 include a plurality of protruding slabs 33 and recesses 34, and the right jaw front edge 42 includes a plurality of recesses 44 and right protruding slabs 43 arranged alternatively and opposite from the left jaw front edge 32. The plurality of left protruding slabs 33 and the plurality of right protruding slabs 43 are arranged alternatively. In addition, with such configuration, under the closed state, the left protruding slabs 33 are able to engage with and abut against the recesses 44 of the right jaw front edge 42, and similarly, the right protruding slabs 43 are able to engage with and abut against the recesses 34 of the left jaw front edge 32. When it is under the open state (as shown in FIG. 9), the left protruding slabs 33 and the right protruding slabs 43 that are slighting protruded outward would not cause any inference during the use. Moreover, when it is under the clamped state (as shown in FIG. 10), the left protruding slabs 33 and the right protruding slabs 43 are able to effectively prevent the clamped object (such as the decorative main body 6) from disengaging from the clamping range of the left jaw portion 31 and the right jaw portion 41.

In addition, as shown in FIG. 7 and FIG. 8, the inner side surfaces of the left jaw portion 31 and the right jaw portion 41 are curved surfaces recessed inward. In this embodiment, the inner side surfaces of the left jaw portion 31 and the right jaw portion 41 further include a plurality of left gear racks 37 and right gear racks 47 capable of providing greater clamping stability in order to accommodate various objects of irregular shapes. In this embodiment, the left gear racks 37 are arranged horizontally at locations opposite from the left protruding slabs 33 respectively, and the right gear racks 47 are arranged horizontally at locations opposite from the right protruding slabs 43.

With the positioning clamp 1 according to the aforementioned embodiment of the present invention, the user can easily operate and clamp it onto an appropriate location (typically, such as, the main stem of a Christmas tree of a relatively stable location) of the decorative main body 6, and the supporting shaft 50 can be inserted into the axial tube 10 of the positioning clamp 1 in order to form a supporting end 51 on the top thereof. The user can then simply mount the ornament 60 onto the supporting end 51 with the mounting portion 61 in order to complete the installation of the tree-top ornament 60, such that it is able prevent the falling off or tipping over of the ornament due to slight shaking. Consequently, it is able to effectively improve the problem of installation difficulty of a known tree-top ornament.

Nevertheless, it shall be understood that the above description is to illustrate the preferred embodiments of the present invention, and any extension, modification, mere changes or equivalent replacements made based on the technical means of the present invention shall still be within the scope of the claims of the present invention.

What is claimed is:

1. An ornament fixture structure, used to secure an ornament onto a decorative main body, comprising:
    a positioning clamp, comprising an axial tube, a left clamp member and a right clam member; wherein the left clamp member and the right clamp member being located at two sides of the axial tube respectively and configured to rotate relative to each other with the axial tube as a supporting point; the left clamp member comprising a left jaw portion extended to a front side thereof and a left wing extended to a rear side thereof; the right clamp member being arranged opposite from the left clamp member and comprising a right jaw portion extended to a front side thereof and a right wing extended to a rear side thereof; the left jaw portion and the right jaw portion arranged to extend in opposite curves and configured to open and close relative to each other in order to allow the positioning clamp to clamp onto the decorative main body; and
    a supporting shaft configured to use a bottom end thereof for attaching onto the axial tube and having a top end formed of a supporting end provided for the ornament to be mounted and attached thereon;
    wherein a front end of the left jaw portion includes a left jaw front edge, a front end of the right jaw portion includes a right jaw front edge, the left clamp member is configured to use the left jaw front edge to engage with and abut against the right jaw front edge of the right clamp member, and an angle formed between the left wing and the right wing is at least greater than 45 degree and less than 90 degree when the left jaw front edge engages with and abuts against the right jaw front edge.

2. The ornament fixture structure according to claim 1, wherein when the left jaw front edge engages with and abuts against the right jaw front edge, the left jaw portion and the right jaw portion are of a generally circular shape.

3. The ornament fixture structure according to claim 1, wherein the positioning clamp further comprises an elastic element; the elastic element is arranged on the axial tube and is configured to provide an elastic reaction force on the left clamp member and the right clam member in order to allow the left jaw portion and the right jaw portion to clamp relative to each other.

4. The ornament fixture structure according to claim 3, wherein when the left jaw front edge engages with and abuts against the right jaw front edge, the left jaw portion and the right jaw portion are of a generally circular shape.

5. The ornament fixture structure according to claim 3, wherein the left clamp member includes a left hinge bracket pivotally attached onto the axial tube and arranged between the left jaw portion and the left wing; and the right clamp member includes a right hinge bracket pivotally attached onto the axial tube and arranged between the right jaw portion and the right wing.

6. The ornament fixture structure according to claim 5, wherein when the left jaw front edge engages with and abuts against the right jaw front edge, the left jaw portion and the right jaw portion are of a generally circular shape.

7. The ornament fixture structure according to claim 3, wherein a top end of the axial tube includes an insertion hole connected thereto in order to allow the supporting shaft to be inserted therein for attachment.

8. The ornament fixture structure according to claim 7, wherein the left jaw front edge includes at least one left protruding slab, and the left protruding slab is configured to engage with and abut against a recess formed at the right jaw front edge.

9. The ornament fixture structure according to claim 8, wherein an inner side surface of the left jaw portion is a curved surface recessed inward, and the inner side surface of the left jaw portion includes a horizontal left gear rack arranged at a location opposite from the left protruding slab.

10. The ornament fixture structure according to claim 9, wherein the left clamp member includes a left hinge bracket pivotally attached onto the axial tube and arranged between the left jaw portion and the left wing; and the right clamp member includes a right hinge bracket pivotally attached onto the axial tube and arranged between the right jaw portion and the right wing.

11. The ornament fixture structure according to claim 9, wherein when the left jaw front edge engages with and abuts against the right jaw front edge, the left jaw portion and the right jaw portion are of a generally circular shape.

12. The ornament fixture structure according to claim 8, wherein the right jaw front edge includes at least one right protruding slab, and the right protruding slab is configured to engage with and abut against a recess formed at the left jaw front edge.

13. The ornament fixture structure according to claim 12, wherein inner side surfaces of the left jaw portion and the right jaw portion are curved surfaces recessed inward, the inner side surface of the left jaw portion includes a horizontal left gear rack arranged at a location opposite from the left protruding slab, and the inner side surface of the right jaw portion includes a horizontal right gear rack arranged at a location opposite from the right protruding slab.

14. The ornament fixture structure according to claim 13, wherein the left clamp member includes a left hinge bracket pivotally attached onto the axial tube and arranged between the left jaw portion and the left wing; and the right clamp member includes a right hinge bracket pivotally attached onto the axial tube and arranged between the right jaw portion and the right wing.

15. The ornament fixture structure according to claim 13, wherein when the left jaw front edge engages with and abuts against the right jaw front edge, the left jaw portion and the right jaw portion are of a generally circular shape.

16. The ornament fixture structure according to claim 7, wherein the left jaw front edge includes a plurality of left protruding slabs and recesses arranged alternatively, and the plurality of left protruding slabs and recesses are configured to correspondingly engage with and abut against a plurality of recesses and protruding slabs arranged alternatively on the right jaw front edge.

17. The ornament fixture structure according to claim 16, wherein inner side surfaces of the left jaw portion and the right jaw portion are curved surfaces recessed inward, the inner side surface of the left jaw portion includes a horizontal left gear rack arranged at a location opposite from the plurality of left protruding slabs respectively, and the inner side surface of the right jaw portion includes a horizontal right gear rack arranged at a location opposite from the plurality of right protruding slabs respectively.

18. The ornament fixture structure according to claim 17, wherein when the left jaw front edge engages with and abuts against the right jaw front edge, the left jaw portion and the right jaw portion are of a generally circular shape.

19. The ornament fixture structure according to claim 17, wherein the left clamp member includes a left hinge bracket pivotally attached onto the axial tube and arranged between the left jaw portion and the left wing; and the right clamp member includes a right hinge bracket pivotally attached onto the axial tube and arranged between the right jaw portion and the right wing.

20. The ornament fixture structure according to claim 19, wherein when the left jaw front edge engages with and abuts against the right jaw front edge, the left jaw portion and the right jaw portion are of a generally circular shape.

\* \* \* \* \*